(12) United States Patent
Bammel et al.

(10) Patent No.: US 8,491,729 B2
(45) Date of Patent: Jul. 23, 2013

(54) CROSS LINKING THIN ORGANIC COATING RESINS TO SUBSTRATES THROUGH POLYFUNCTIONAL BRIDGING MOLECULES

(75) Inventors: Brian D. Bammel, Rochester Hills, MI (US); Thomas S. Smith, II, Novi, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 371 days.

(21) Appl. No.: 12/993,561

(22) PCT Filed: May 19, 2009

(86) PCT No.: PCT/US2009/044497
§ 371 (c)(1),
(2), (4) Date: Jan. 11, 2011

(87) PCT Pub. No.: WO2009/143140
PCT Pub. Date: Nov. 26, 2009

(65) Prior Publication Data
US 2011/0114225 A1    May 19, 2011

Related U.S. Application Data

(60) Provisional application No. 61/054,366, filed on May 19, 2008.

(51) Int. Cl.
*C23C 22/48* (2006.01)

(52) U.S. Cl.
USPC ..... 148/247; 148/274; 106/14.11; 106/14.15; 106/14.37; 106/14.41; 106/14.42; 106/14.43; 106/14.44; 106/14.45; 428/432

(58) Field of Classification Search
USPC ................. 148/247, 274; 106/14.11, 14.15, 106/14.37, 14.41, 14.42, 14.43, 14.44, 14.45; 428/432
See application file for complete search history.

(56) References Cited

U.S. PATENT DOCUMENTS
2008/0230395 A1* 9/2008 Inbe et al. ............... 205/261

* cited by examiner

*Primary Examiner* — Lois Zheng
(74) *Attorney, Agent, or Firm* — Mary K. Cameron

(57) ABSTRACT

Disclosed is a method for providing an anti-corrosion protective coating to a metal substrate that uses a coating composition comprising a resin and a polyfunctional bridging molecule to both bind to the resin and to chelate the bound polymeric resin directly to the metal substrate. One category of polyfunctional bridging molecules preferably includes at least one amine function to bind to a resin and at least one carboxylate, thiol, silane, phenolate, acetoacetonate, imine, phosphate, or phosphonate function to chelate to a metal substrate. It is theorized that the amine function can bind to certain pendent chains in coating resins through a Michael addition reaction while the carboxylate, thiol, silane, phenolate, acetoacetonate, imine, phosphate, or phosphonate functions chelate to the metal substrate. These polyfunctional bridging molecules provide an organic binding of the resin to the metal substrates.

16 Claims, 1 Drawing Sheet

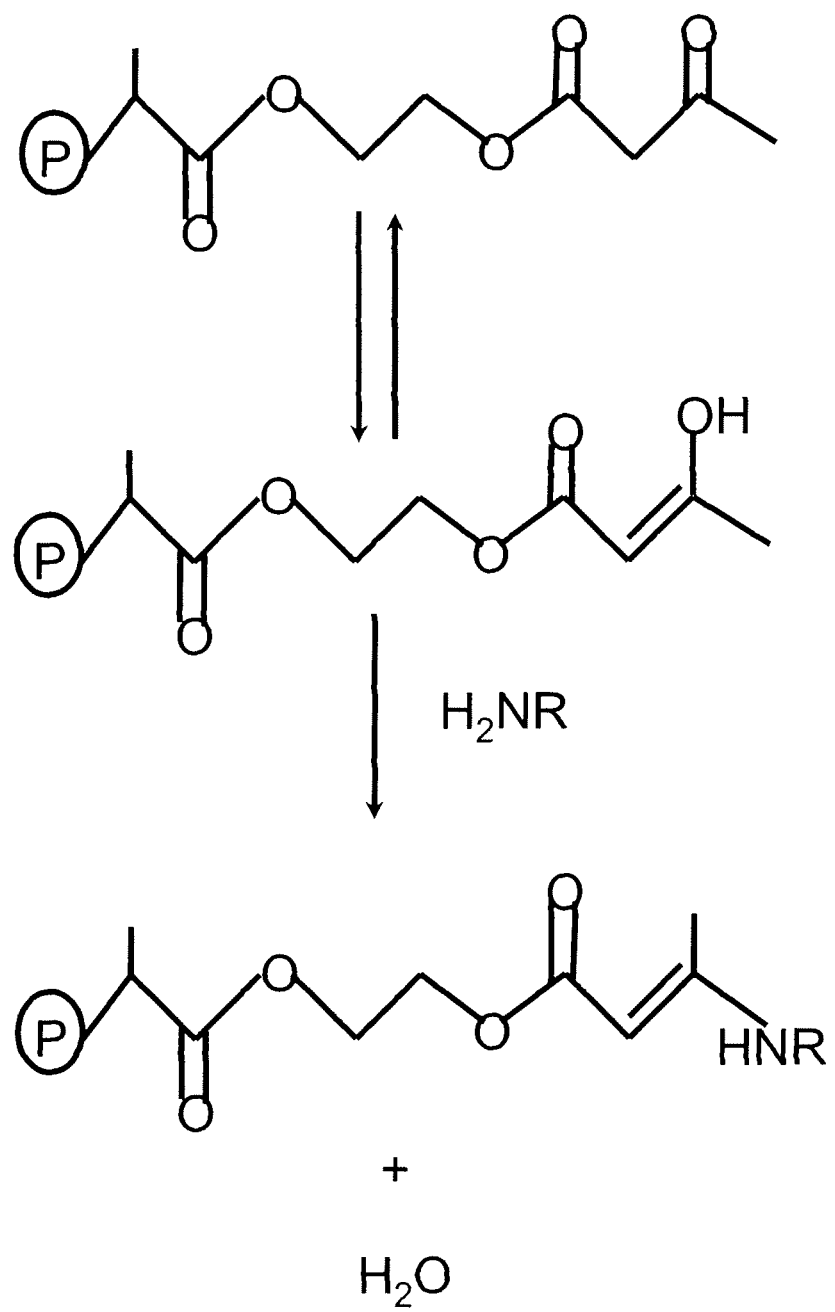

CROSS LINKING THIN ORGANIC COATING RESINS TO SUBSTRATES THROUGH POLYFUNCTIONAL BRIDGING MOLECULES

RELATED APPLICATIONS

This claims the benefit of PCT/US2009/044497 filed May 19, 2009 which claims the benefit of U.S. Provisional Application No. 61/054,366 filed May 19, 2008, which are incorporated herein by reference in their entirety.

STATEMENT REGARDING FEDERALLY SPONSORED RESEARCH

NONE

TECHNICAL FIELD

This invention relates generally to binding of organic coatings to substrates and, more particularly, to binding of organic coating resins to metallic substrates through polyfunctional bridging molecules to provide enhanced properties such as corrosion resistance and binding to the metallic substrates.

BACKGROUND OF THE INVENTION

Coating resins have been used for many years to coat metallic substrates. The coating resins are designed to provide corrosion resistance, to provide mechanical properties to the substrate, to effect the physical characteristics of the substrate, or to change the appearance of the substrate. Typically the coating resins are organic polymers and the substrates are metallic. Often cross-linking molecules are used to cross-link polymer chains in the resin thereby effecting its interaction with the substrate. Sometimes inorganic compounds are used in the coating process to enhance the interactions between the coating resin and the substrate. Typically the treatments comprise a pre-treatment with a phosphate solution followed by a chromate conversion coating. In addition, these typical treatments also require very acidic conditions. There is currently a desire to replace the inorganic compounds phosphate and the chromates due to concerns about their environmental impact. In addition, it is desirable to enhance the binding of coating resins to substrates especially using organic compounds. Finally, it is desirable to develop polyfunctional bridging molecules that are able to bind to the resin and to the substrate at neutral or alkaline pH.

SUMMARY OF THE INVENTION

In general terms, this invention provides reaction processes and polyfunctional bridging molecules that allow the polyfunctional bridging molecules to bind to the resin and to chelate directly to metallic substrates. The present invention eliminates the need to pre-treatment the metal substrate with phosphates or other pre-treatments. In one embodiment the process of binding the resin to the bridging molecule is believed to be occurring through a Michael conjugation process to form a Michael addition product. The bridging molecule also includes at least one chelating group to chelate it to the metal substrate. Typical chelating groups useful in all embodiments of the present invention include carboxylates, thiols, silanes, phenolates, acetoacetonates, imines, phosphates, and phosphonates. Functional groups that can participate in the Michael conjugation include on the resin $\beta$-diketones, such as are found on acetoacetoxyethyl methacrylate, with functional groups on the bridging molecule including primary amines, aldehydes, thiols, isocyanates, melamine, and electron-poor alkenes. In another embodiment, an enamine is formed when the $\beta$-diketone group on the resin reacts with a secondary amine on the bridging molecule to form the enamine, rather than by a Michael conjugation. In another embodiment the reaction between the resin and the bridging molecule involves hydrazone formation using resin functional groups that are acrylamides, such as diacetone acrylamide, and a bridging molecule functional group that is a hydrazide. In another embodiment the reaction between the bridging molecule and the resin involves reductive amination. In this reaction the resin has a primary or secondary amine group and the bridging molecule has an aldehyde functional group. This reaction would require use of a reducing agent to make the reaction irreversible. In the final embodiment the reaction between resin and bridging molecule occurs through amide formation. In this embodiment the resin has an amine or carboxylate functional group and the bridging molecule has the other of either a carboxylate or amine function group.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 1 is a schematic representation of a Michael addition reaction that may occur in one embodiment between a pendent chain of an acetoacetoxyethyl methacrylate in a resin polymer (P) and a bridging molecule designed according to the present invention.

DETAILED DESCRIPTION OF A PREFERRED EMBODIMENT

The present invention is directed toward use of organic polyfunctional bridging molecules to aid in binding coating resins to metallic substrates. In the past cross-linking compounds have been used to cross-link polymer chains of coating resins together. A typical example of such a cross-linker that binds polymer chains together is the compound hexamethylenediamine. The amine functions on each end of hexamethylenediamine can react with functional groups on pendant chains, for example from incorporation of acetoacetoxyethyl methacrylate (AAEM) into the polymer, on the resin polymer. Typically an inorganic compound is then used to help bind or chelate the cross linked coating resin to the metallic substrate. It would be advantageous to replace these inorganic compounds given the environmental concerns raised by their use. In addition, it would be advantageous to create a method for creating bonds between the coating resin and the metallic substrates that relies on organic compounds.

As described above there are a series of potential reactions that can be used to bind a polyfunctional bridging molecule to functional resin groups. The potential reactions include Michael conjugation, enamine formation, hydrazone formation, reductive amination, and amide formation. Below are specific examples of use of polyfunctional bridging molecules in a Michael conjugation in conjunction with chelating carboxylate and thiol groups on the bridging molecule to chelate to the metal substrate. The present invention is directed toward treatment of bare metal substrates meaning that the metal substrate has not been pre-treated with any metal phosphate solutions, chrome-containing rinses, or any other passivating treatments. Metal substrates that benefit from the process of the present invention include steel, cold rolled steel, hot rolled steel, stainless steel, aluminum, steel coated with zinc metal and steel coated with zinc alloys such as electrogalvanized steel, Galvalume®, galvanneal, and hot-dipped galvanized steel, and mixtures of these substrates. Preferably, the metal surface has been cleaned and degreased prior to treatment according to the present invention. Cleaning of metal surfaces is well known in the art and can include mild or strongly alkaline cleaners. Examples of two alkaline cleaners include Parco® Cleaner ZX-1 and Parco® Cleaner 315 both available from Henkel Surface Technologies. Following cleaning the surface is preferably rinsed with water prior to treatment according to the present invention.

EXAMPLE 1

Thin Organic Coating Resin

A thin organic coating resin was prepared as described below. The resin included as monomers: acetoacetoxyethyl methacrylate (AAEM), n-butyl methacrylate, styrene, methyl methacrylate, 2-ethylhexyl acrylate, and ADD APT PolySurf HP which is a mixture of methacrylated mono and di-phosphate ester. Other sources of phosphate containing monomers that could be used include Ebecryl 168 from Radcure Corporation. The total monomer distribution in the resin was as follows: 20.00% AAEM, 12.50% n-butyl methacrylate, 15.00% styrene, 27.50% methyl methacrylate, 20.00% 2-ethylhexyl acrylate, and 5.00% ADD APT PolySurf HP. The resin polymerization reaction was run under $N_2$ with stirring and a heat set point of 70° C. The initial reactor charge was 241.01 grams of deionized (DI) water, and 2.62 grams of ammonium lauryl sulfate (Rhodapon L-22 EP). The second reactor charge was 2.39 grams of ferrous sulfate 0.5% $FeSO_4 7H_2O$ (3 ppm). The two initiator co-feeds were 1.62 grams of $HOCH_2SO_2Na$ in 23.38 grams of DI water and 2.31 grams of tert-butylhydroperoxide in 22.69 grams of DI water. The monomer co-feed was 114.41 grams of DI water, 18.00 grams of surfactant (Tergitol 15-S-20 a secondary alcohol ethoxylate), 2.62 grains of ammonia lauryl sulfate (Rhodapon L-22 EP), 68.18 grams of AAEM, 43.05 grams of n-butyl methacrylate, 51.39 grams of styrene, 94.70 grams of methyl methacrylate, 69.58 grams of 2-ethylhexyl acrylate, and 17.05 grams of ADD APT PolySurf HP. The neutralizer charge was 6.52 grams of 28% ammonium hydroxide in 18.48 grams of DI water. The process commenced with adding the initial reactor charge to the reaction vessel with stirring for 30 minutes. Then 25 grams of the monomer co-feed was added to the reaction vessel as a seed along with 4 milliliters of each initiator co-feed and the second reactor charge. Then the monomer co-feed was fed into the reaction vessel over a 3 hour period and the initiator co-feeds were fed into the reaction vessel over a 4 hour period. After the final addition of the initiator co-feeds the reaction was run for an additional 40 minutes and then cool down to 38° C. was begun. After 1 hour and 45 minutes of cool down the neutralizer charge was added to the reaction vessel. Additional surfactant stabilizers that could be used in place of Tergitol 15-S-20, which is a secondary alcohol ethoxylate, are other non-ionic stabilizers having a hydrophilic lipophilic balance of from 15 to 18. Examples of these stabilizers include: other secondary alcohol ethoxylates such as Tergitol 15-S-15; blends of ethoxylates such as Abex 2515; alkyl polyglycol ether such as Emulsogen LCN 118 or 258; tallow fatty alcohol ethoxylate such as Genapol T 200 and T 250; isotridecyl alcohol ethoxylates such as Genapol X 158 and X 250; tridecyl alcohol ethoxylates such as Rhodasurf BC-840; and oleyl alcohol ethoxylates such as Rhoadsurf ON-877.

Using the resin created in example 1 a series of eight coating compositions were prepared as defined below in Table 1 wherein for each of the eight formulas the percent by weight of each component is given. Each coating composition had a different potential binding molecule added. The first molecule used is the well known polymer to polymer cross-linking molecule hexamethylenediamine, which has two reactive primary amine functions on its ends. The next three molecules are also polymer to polymer cross-linkers and contain only amine functions on their ends. The final four molecules all include at least one primary amine function and a carboxylate function or a carboxylate function and a thiol function. These four are referred to as polyfunctional bridging molecules in the present invention because it is believed that they will be able to both bind to functional groups on the resin polymer chains and to chelate with the metallic substrates thereby providing a bridge between the coating composition and the metallic substrate. The 11-aminoundecanoic acid has a primary amine function on one end and a carboxylate on the other. The lysine includes two primary amine functions and a carboxylate function. The cysteine has a primary amine function, a thiol functional group and a carboxylate function. The cystine includes at each end a primary amine function and a carboxylate function with a disulfide linkage in the center. The two control coating compositions used are commercially available and comprised either Passerite 3000 (P3000B) or Granocoat 342 (G342). The control coating compositions were applied per the manufacture's instructions. The prepared coating compositions 1-8 were then coated onto a series of metallic substrates for testing of the corrosion resistance in neutral salt spray (NSS) testing using ASTM B117.

TABLE 1

| Component | 1 | 2 | 3 | 4 | 5 | 6 | 7 | 8 |
|---|---|---|---|---|---|---|---|---|
| DI water | 65.17 | 65.27 | 65.24 | 65.37 | 64.69 | 65.13 | 65.00 | 65.02 |
| Ammonium zirconyl carbonate (Bacote 20 ®) | 24.00 | 24.00 | 24.00 | 24.00 | 24.00 | 24.00 | 24.00 | 24.00 |
| $V_2O_5$ | 0.50 | 0.50 | 0.50 | 0.50 | 0.50 | 0.50 | 0.50 | 0.50 |
| Resin example 1 | 10.00 | 10.00 | 10.00 | 10.00 | 10.00 | 10.00 | 10.00 | 10.00 |
| Hexamethylenediamine | 0.33 | | | | | | | |
| 1,5 Diamino-2-methylpentane | | 0.23 | | | | | | |
| Aminoethylpiperazine | | | 0.26 | | | | | |
| Diethylenetriamine | | | | 0.13 | | | | |
| 11-Aminoundecanoic acid | | | | | 0.81 | | | |
| Lysine - HCl | | | | | | 0.37 | | |
| Cysteine | | | | | | | 0.50 | |
| Cystine | | | | | | | | 0.48 |

The component Bacote 20® is one preferred source of ammonium zirconyl carbonate and it is available from MEI in Flemington N.J. According to the literature from MEI, Bacote 20® is a clear, aqueous alkaline solution of stabilized ammonium zirconium carbonate containing anionic hydroxylated zirconium polymers. It provides approximately 20% w/w of $ZrO_2$. The coating compositions all had a pH of from 6 to 11. The test panels were coated with the formulas from Table 1 in a dry in place process as known to those of skill in the art. The coatings were applied at a coating weight of approximately 200 milligrams per square foot (200 milligrams per 929.03 square centimeters) to each panel and then dried to a peak metal temperature of 210° F. (99° C.).

The coated panels were then tested for corrosion resistance using NSS according to ASTM B117. For each time point multiples of each condition were examined and the percentage of the total surface corroded was determined and averaged. In addition to the test panels control panels were run for each substrate using the control coating compositions of either Passerite 3000B (P3000B) a chrome acrylic coating composition or Granocoat 342 (G342) a non-chrome containing coating composition. The results for the control panels are given in Table 5 below. The results for the U.S. Steel Corporation (USS) Galvalume® panels coated with formulas 1-8 are given below in Table 2. The Galvalume® panels are sheet steel covered in a 55% aluminum-zinc alloy coating as known in the art. The results demonstrate that among the polymer cross-linkers of formulas 1-4 the hexamethylenediamine and the 1,5 diamino-2-methylpentane functioned better in the corrosion testing than the aminoethylpiperazine and the diethylenetriamine. By the end of 816 hours formulas 1 and 2 were over twice as good as either formula 3 or 4. All of the polyfunctional bridging molecules in formulas 5-8 performed at least as well as the hexamethylenediamine out to 456 hours and beyond. In fact, the amino acid polyfunctional bridging molecules performed better than the hexamethylenediamine out to 816 hours of testing. The polyfunctional amino acids also seemed to perform better than the 11-aminoundecanoic acid at 456 hours and beyond. Compared to the control results using P3000B or G342, the polyfunctional bridging molecules of formulas 5-8 all performed much better than the G342, which showed 36.7% corrosion by 336 hours and 100% by 504 hours. The results with the polyfunctional bridging molecules of the present invention were nearly as good as the chrome acrylic composition P3000B out to about 456 hours for the amino acids and cystine polyfunctional bridging molecules. The best overall results seemed to be achieved with cysteine as the polyfunctional bridging molecule. The results demonstrate the usefulness of the polyfunctional bridging molecules of the present invention in serving to enhance the anti-corrosive protection provided by the resin to USS Galvalume® substrates. The coating compositions according to the present invention are non-chrome containing and do not require phosphating of the metal surface prior to application. They can be applied directly to the bare metal and provide significant corrosion protection that is nearly as good as the chrome acrylic P3000.

TABLE 2

| Coating | 24 hr | 48 hr | 120 hr | 168 hr | 288 hr | 456 hr | 624 hr | 816 hr |
|---|---|---|---|---|---|---|---|---|
| 1 | 0 | 0 | 0 | 0 | 1.7 | 5 | 7 | 11 |
| 2 | 0 | 0 | 0 | 0 | 3 | 10.7 | 15.3 | 11 |
| 3 | 0 | 0 | 0.3 | 1 | 3 | 12 | 30 | 22 |
| 4 | 0.7 | 1 | 3 | 3 | 5.7 | 19 | 36.7 | 30 |

TABLE 2-continued

| Coating | 24 hr | 48 hr | 120 hr | 168 hr | 288 hr | 456 hr | 624 hr | 816 hr |
|---|---|---|---|---|---|---|---|---|
| 5 | 0 | 0 | 1.3 | 1.7 | 1.7 | 10.3 | 15.7 | 10.3 |
| 6 | 0 | 0 | 0.7 | 1 | 1 | 1 | 6.7 | 8 |
| 7 | 0 | 0 | 0 | 0 | 0 | 0 | 4.3 | 6 |
| 8 | 0 | 0 | 1 | 1 | 1 | 1 | 5.7 | 8.3 |

The results for the Steelscape Galvalume® panels coated with formulas 1-8 are given below in Table 3. The results demonstrate that none of the coatings performed as well on Steelscape Galvalume® as on USS Galvalume®. The polyfunctional bridging molecules according to the present invention of formulas 5-8 all performed much better than either of the cross-linkers in formulas 3 or 4. The polyfunctional bridging molecules of the present invention in formulas 5, 6, and 8 performed as well as either cross-linker formulas 1 or 2. The polyfunctional bridging molecule of the present invention in formula 7, cysteine, performed best overall of all the tested formulas. In fact the cysteine was nearly as good as the P3000B out to 816 hours of testing. All of the formulas, except for 3 and 4, were better than the G342. The results demonstrate the usefulness of the polyfunctional bridging molecules of the present invention in serving to enhance the anti-corrosive protection provided by the resin to Steelscape Galvalume® substrates.

TABLE 3

| Coating | 24 hr | 48 hr | 120 hr | 168 hr | 288 hr | 456 hr | 624 hr | 816 hr |
|---|---|---|---|---|---|---|---|---|
| 1 | 0 | 0 | 0 | 0 | 1 | 11 | 20.7 | 33.3 |
| 2 | 0 | 0 | 0 | 0 | 1 | 12 | 20.7 | 30 |
| 3 | 2.3 | 4.3 | 7.3 | 12 | 13.3 | 50 | — | — |
| 4 | 3 | 5 | 12 | 26.7 | 38.3 | 86.7 | — | — |
| 5 | 0 | 0 | 0 | 0 | 1 | 8 | 26.7 | 30 |
| 6 | 0 | 0 | 0 | 0 | 1.7 | 14.3 | 30 | 36.7 |
| 7 | 0 | 0 | 0 | 0 | 1 | 5 | 7 | 20 |
| 8 | 0 | 0 | 0 | 0 | 1.7 | 16 | 20 | 36.7 |

The results for the National Hot Dip Galvanized (HDG) ACT HDG APR 31893 panels are given below in Table 4. The results demonstrate that neither the cross-linkers of formulas 1-4 nor the polyfunctional bridging molecules in formulas 5-8 of the present invention were as effective at preventing corrosion on this substrate as they were on the Galvalume® substrates above. The same is true of the control compositions P3000B and G342, they also did not perform as well. Again the best performance was achieved by the polyfunctional bridging molecule cysteine in formula 7. The polyfunctional bridging molecule cystine of formula 8 was the second most effective, but by 168 hours there was over 40% corrosion even with this polyfunctional bridging molecule. Prior to 168 hours the polyfunctional bridging molecules in formulas 5 and 6 were better than the cross-linking molecules of formulas 1-4, but by 168 hours they showed a similar amount of corrosion. The results again demonstrate that the polyfunctional bridging molecules of the present intention function at least as well as the know cross-linking molecules. In addition, the cysteine polyfunctional bridging molecule is superior to the other polyfunctional bridging molecules tested and far superior to the cross-linking molecules in formulas 1-4.

TABLE 4

| Coating | 24 hr | 48 hr | 120 hr | 168 hr | 288 hr |
|---|---|---|---|---|---|
| 1 | 2.7 | 3.3 | 35 | 50 | — |
| 2 | 1 | 7 | 40 | 60 | — |
| 3 | 3.7 | 6.3 | 36.7 | 50 | — |
| 4 | 1 | 4.3 | 46.7 | 60 | — |
| 5 | .3 | .7 | 28.7 | 60 | — |
| 6 | .7 | 1 | 26.7 | 50 | — |
| 7 | 0 | 0 | 10 | 12 | 56.7 |
| 8 | 1 | 1 | 31.7 | 43.3 | 86.7 |

Control panels for each substrate were coated with either Passerite 3000 (P3000B) or Granocoat 342 (G342). The test results are provided below in Table 5.

TABLE 5

| Substrate/coating | 24 hr | 48 hr | 72 hr | 96 hr | 168 hr | 336 hr | 504 hr | 672 hr | 840 hr |
|---|---|---|---|---|---|---|---|---|---|
| USS Galvalume ® P3000B | 0 | 0 | 0 | 0 | 0 | 0 | 3 | 3 | 3 |
| USS Galvalume ® G342 | 0 | 0 | 0 | 0 | 1.7 | 36.7 | 100 | — | — |
| Steelscape Galvalume ® P3000B | 0 | 0 | 0 | 0 | 0.3 | 2.3 | 4.3 | 5 | 12 |
| Steelscape Galvalume ® G342 | 0 | 0 | 0 | 0 | 2.3 | 30 | 60 | — | — |
| National HDG P3000B | 0 | 0 | 0.3 | 0.7 | 56.7 | — | — | — | — |
| National HDG G342 | 2 | 2 | 2.3 | 3.7 | 15.3 | 70 | — | — | — |

It is theorized that the enhanced functionality provided by the polyfunctional bridging molecules described above may be occurring in part through a Michael addition wherein the amine function on the polyfunctional bridging molecule binds to a pendent AAEM chain as shown schematically in FIG. 1. As shown in the FIGURE the AAEM chain, which is pendent from the polymer backbone represented by (P) in the FIGURE, is found in the keto and enol forms. The enol form can react with the primary amine through loss of water to bind the polyfunctional bridging molecule to the resin AAEM chain. It is additionally theorized that the carboxylate function of the polyfunctional bridging molecules of examples 5-8 may be providing chelation to the metal substrates. In the case of the polyfunctional bridging molecules cystine and cysteine the thiol functions provide additional chelating sites to chelate the metal substrate. Other useful chelating groups that can be included in bridging molecules useful in the present invention include silanes, phenolate, acetoacetonate, imine, phosphate, and phosphonates which could be included in a polyfunctional bridging molecule designed according to the present invention.

It is believed that one embodiment of successful polyfunctional bridging molecules are those that have an amine function for binding to the pendent chains of resins incorporating AAEM or other monomer having similar pendant chain functions and a chelating group as described above to chelate to the metallic substrates. Examples include amino acids, cystine and other polyfunctional bridging molecules with at least one amine and at least one carboxylate function or thiol function. Examples of the later class include 11-aminoundecanoic acid and could include polyfunctional bridging molecules like it with shorter or longer carbon chains between the amine and carboxylate function. The linkage between the resin binding group and the metal chelating group on the polyfunctional bridging molecule could also include branched chains, ring structures, aromatic structures and other linkages.

Other examples of polyfunctional bridging molecules and reaction processes to bind them to the resin according to the present invention include hydrazone formation between acrylamide resin groups provided by for example diacetone acrylamide and hydrazide groups on the polyfunctional bridging molecule. In another embodiment the reaction is a reductive amination using primary or secondary amines on the resin and aldehyde groups on the polyfunctional bridging molecule in the presence of a reducing agent. In another embodiment the reaction is amide formation using amine or carboxylic acid groups on the resin and the other of carboxylic acid or amine groups on the polyfunctional bridging molecule. In another embodiment, the reaction is enamine formation using β-diketone groups on the resin and secondary amines on the bridging molecule. In all of these embodiments the polyfunctional bridging group would also include at least one metal chelating group such as a carboxylate, a thiol, a silane, a phenolate, an acetoacetonate, an imine, a phosphate, or a phosphonate. The polyfunctional bridging molecule can also include multiple groups able to participate in binding to the resin, chelating to the metal, or both. It is believed that best corrosion protection results will be obtained when the molar ratio of polyfunctional bridging molecules to reactive resin groups is in the range of 0.5:1 to 1.5:1, more preferably from 0.5:1 to 1.25:1, and most preferably from 0.5:1 to 1:1.

The coating composition according to the present invention preferably has a pH of from about 6 to 11 and more preferably from 8 to 10. The coating compositions described above comprise ammonium zirconyl carbonate as a source of $ZrO_2$ and also include $V_2O_5$ in addition to the polyfunctional bridging molecule and resin. Preferably, the coating composition according to the present invention includes from 1 to 7% by weight of at least one element from group IVB of the Periodic Table, more preferably from 2 to 5% by weight and most preferably from 3 to 5% by weight based on the total weight. These group IVB transition metal elements are zirconium, titanium, and hafnium. Preferably, the coating composition also includes at least one transition metal from group VB of the Periodic Table present in an amount of from 0.20 to 2.00% by weight and more preferably from 0.40% to 1.00% by weight based on the total weight. These group VB elements include vanadium, niobium, and tantalum. The coating composition is a dry in place conversion coating and is also chrome free thus does not have the environmental issues associated with chrome-based coatings. The coating is very versatile because it can accommodate addition of a wide variety of organic coating resins which can be added directly to the coating composition thus eliminating multistep coating processes. The coating preferably also includes at least one reducing agent for the $V_2O_5$ such as cysteine, $Sn^{2+}$, ascorbic acid, or thiosuccinic acid when $V_2O_5$ is used. Optionally, one could initially start with $V^{+4}$ from vanadyl sulfate or vanadyl acetylacetonate. Optionally, the coating can also include processing aids such as waxes which aid in formability of the coated substrates.

Coatings prepared according to the present invention are designed to be applied directly to bare metal substrates without the need for any phosphate or other pre-treatments other than cleaning. They can be applied at any desired coating weight required by the situation, preferably they are applied at a coating weight of from 150 to 400 milligrams per square foot (150 to 400 milligrams per 929.03 square centimeters), more preferably at from 175 to 300 milligrams per square foot (175 to 300 milligrams per 929.03 square centimeters) and most preferably at from 175 to 250 milligrams per square foot (175 to 250 milligrams per 929.03 square centimeters). The coatings can be applied by any method known in the art including by bath dipping, spraying, rolling, draw bar or any other method. The coatings of the present invention are dry in place coatings as known in the art and are dried to a peak metal temperature of from 110 to 350° F. (43 to 177° C.), more preferably to from 180 to 350° F. (82 to 177° C.), most preferably to a PMT of from 200 to 325° F. (93 to 163° C.).

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A coating composition for metallic substrates comprising:
   reaction products of a polymeric resin having a plurality of first functional groups with a plurality of polyfunctional bridging molecules each having at least a second functional group and a third functional group; wherein at least a portion of said second functional groups have reacted with at least a portion of said first functional groups to form one of a Michael addition product, an enamine, a hydrazone, a reductive amination product, or an amide thereby binding at least a portion of said polyfunctional bridging molecules to said resin;
   said third functional group selected from the group consisting of a carboxylate function, a thiol function, a silane function, a phenolate function, an acetoacetonate function, an imine function, a phosphate function, a phosphonate function and mixtures thereof, wherein said third functional group can chelate to a metal substrate; and
   at least one of a group IVB element from the Periodic Table and a group VB element of the Periodic Table.

2. The coating composition as recited in claim 1 wherein said coating composition has a pH of from 6 to 11.

3. The coating composition as recited in claim 1, wherein said first functional group is a beta-diketone function and said second functional group is selected from the group consisting of a primary amine, an aldehyde, a thiol, an isocyanate, and a melamine and wherein at least a portion of said second functional groups have reacted with at least a portion said first functional groups to form a Michael addition product to bind at least a portion of said polyfunctional bridging molecules to said resin.

4. The coating composition as recited in claim 1, wherein said first functional group is a beta-diketone function and said second functional group is a secondary amine and wherein at least a portion of said second functional groups have reacted with at least a portion of said first functional groups to form an enamine to bind at least a portion of said polyfunctional bridging molecules to said resin.

5. The coating composition as recited in claim 1 wherein said first functional group is an acrylamide function and said second functional group is a hydrazide function and wherein at least a portion of said second functional groups have reacted with at least a portion of said first functional groups to form a hydrazone to bind at least a portion of said polyfunctional bridging molecules to said resin.

6. The coating composition as recited in claim 1 wherein said first functional group is one of a primary amine or a secondary amine function and said second functional group is a aldehyde function and wherein at least a portion of said second functional groups have reacted with at least a portion of said first functional groups through a reductive amination to bind at least a portion of said polyfunctional bridging molecules to said resin.

7. The coating composition as recited in claim 1 wherein said first functional group is one of an amine or a carboxylate function and said second functional group is the other of an amine or a carboxylate function and wherein at least a portion of said second functional groups reacts with at least a portion of said first functional groups through an amide formation to bind at least a portion of said polyfunctional bridging molecules to said resin.

8. The coating composition as recited in claim 1, wherein said second functional group is an amine and wherein said third functional group comprises a carboxylate or a thiol.

9. The coating composition as recited in claim 1, wherein said third functional group is able to chelate to a metal substrate selected from the group consisting of steel, cold rolled steel, hot rolled steel, stainless steel, aluminum, steel coated with zinc metal, steel coated with zinc alloys, and mixtures thereof.

10. The coating composition as recited in claim 1, wherein the coating composition includes from 1 to 7% by weight based on the total coating composition weight of a group IVB element comprising zirconium, titanium, or a mixture thereof.

11. The coating composition as recited in claim 1, wherein the coating composition includes from 0.2 to 2.0% by weight based on the total coating composition weight of the group VB element vanadium.

12. The coating composition as recited in claim 11, further comprising at least one reducing agent for the vanadium selected from the group consisting of cysteine, $Sn^{2+}$, ascorbic acid, and thiosuccinic acid.

13. The coating composition as recited in claim 1, wherein said polyfunctional bridging molecule comprises cysteine.

14. The coating composition as recited in claim 1, wherein the molar ratio of polyfunctional bridging molecules to first functional groups is from 0.5:1 to 1.5:1.

15. A coated metal substrate comprising a metal substrate coated with a coating composition comprising:
   reaction products of a polymeric resin having a plurality of first functional groups with a plurality of polyfunctional bridging molecules each having at least a second functional group and a third functional group;
   wherein at least a portion of said second functional groups have reacted with at least a portion of said first functional groups to form one of a Michael addition product, an enamine, a hydrozone, a reductive amination product, or an amide thereby binding at least a portion of said polyfunctional bridging molecules to said resin; and
   wherein said third functional group is selected from the group consisting of a carboxylate function, a thiol function, a silane function, a phenolate function, an acetoacetonate function, an imine function, a phosphate function, a phosphonate function and mixtures thereof and can chelate said metal substrate; and
   at least one of a group IVB element from the Periodic Table and a group VB element of the Periodic Table.

16. A method of protecting a metal substrate from corrosion comprising the following steps:
   a) providing a bare metal substrate;
   b) providing a coating composition comprising:
      reaction products of a polymeric resin having a plurality of first functional groups with a plurality of polyfunctional bridging molecules each having at least a second functional group and a third functional group, wherein at least a portion of the second functional groups have reacted with at least a portion of the first functional groups to form one of a Michael addition product, an enamine, a hydrozone, a reductive amination product, or an amide thereby binding at least a portion of the polyfunctional bridging molecules to the resin; and wherein the third functional group is selected from the group consisting of a carboxylate function, a thiol function, a silane function, a phenolate function, an acetoacetonate function, an imine function, a phosphate function, a phosphonate function and mixtures thereof and can chelate directly to the metal substrate; and at least one of a group IVB element from the Periodic Table and a group VB element of the Periodic Table; and c) applying the coating composition directly to the bare metal substrate and drying it in place.

* * * * *